United States Patent
Kim et al.

(10) Patent No.: US 12,331,728 B2
(45) Date of Patent: Jun. 17, 2025

(54) VERTICAL-AXIS-TYPE WIND TURBINE EQUIPPED HIGH-TEMPERATURE SUPERCONDUCTING GENERATOR WITH BATCH IMPREGNATION COOLING STRUCTURE USING CRYOGEN

(71) Applicant: INDUSTRY-ACADEMIC COOPERATION FOUNDATION JEJU NATIONAL UNIVERSITY, Jeju-si (KR)

(72) Inventors: Ho Min Kim, Jeju-si (KR); Ji Hyung Kim, Jeju-si (KR); Yoon Seok Chae, Jeju-si (KR); Sa Il Park, Jeju-si (KR)

(73) Assignee: INDUSTRY-ACADEMIC COOPERATION FOUNDATION JEJU NATIONAL UNIVERSITY, Jeju-si (KR)

( * ) Notice: Subject to any disclaimer, the term of this patent is extended or adjusted under 35 U.S.C. 154(b) by 0 days.

(21) Appl. No.: 18/498,088

(22) Filed: Oct. 31, 2023

(65) Prior Publication Data
US 2024/0060471 A1    Feb. 22, 2024

Related U.S. Application Data

(63) Continuation of application No. PCT/KR2022/012115, filed on Aug. 12, 2022.

(30) Foreign Application Priority Data

Aug. 30, 2021    (KR) .................. 10-2021-0114862

(51) Int. Cl.
F03D 9/00    (2016.01)
F03D 9/25    (2016.01)

(52) U.S. Cl.
CPC .................... F03D 9/25 (2016.05)

(58) Field of Classification Search
CPC .......... F03D 9/25; F03D 3/005; F03D 13/256; F03D 80/602; H02K 7/183; H02K 55/00; H02K 55/04; F05B 2220/706; H01F 6/06
See application file for complete search history.

(56) References Cited

U.S. PATENT DOCUMENTS

| | | | |
|---|---|---|---|
| 8,204,562 B2 | 6/2012 | Kwon et al. | |
| 2019/0234381 A1* | 8/2019 | Soerensen | F03D 80/60 |
| 2021/0270239 A1* | 9/2021 | Torrey | H02K 55/02 |

FOREIGN PATENT DOCUMENTS

| | | |
|---|---|---|
| JP | 2006-141128 A | 6/2006 |
| KR | 10-2010-0013751 A | 2/2010 |

(Continued)

Primary Examiner — Julio C. Gonzalez
(74) Attorney, Agent, or Firm — NKL LAW; Jae Youn Kim (57) ABSTRACT

The present invention relates to a vertical axis wind turbine equipped with a high-temperature superconducting generator having a batch impregnation cooling structure.
The vertical axis wind turbine is configured to allow the superconducting generator and accessory devices (a cooling system, a power conversion system, etc.) to be located under a turbine tower, whereas allowing only a rotary body with vertical blades to be located on the upper portion of the turbine tower, unlike a conventional horizontal axis wind turbine, thereby remarkably reducing a top-head weight of the wind turbine, greatly decreasing installation and maintenance costs, removing technical difficulties in large scale construction, and allowing a center of weight to move to a portion under the turbine tower so that if the vertical axis wind turbine is applied for floating offshore wind power generation, it advantageously ensures the miniaturization of a floating body and the stability of a floating posture.

4 Claims, 6 Drawing Sheets

(56) References Cited

FOREIGN PATENT DOCUMENTS

| KR | 10-2014-0050169 A | 4/2014 |
|---|---|---|
| KR | 10-1766684 B1 | 8/2017 |
| KR | 10-2371278 B1 | 3/2022 |

* cited by examiner

Example of application of contact type exciter
for exciting high-temperature superconducting field coil

FIG.4

Example of application of non-contact type exciter for exciting high-temperature superconducting field coil

VERTICAL-AXIS-TYPE WIND TURBINE EQUIPPED HIGH-TEMPERATURE SUPERCONDUCTING GENERATOR WITH BATCH IMPREGNATION COOLING STRUCTURE USING CRYOGEN

TECHNICAL FIELD

The present invention relates to a vertical axis wind turbine equipped with a high-temperature superconducting generator having a batch impregnation cooling structure using a cryogen that is configured to allow the superconducting generator and accessory devices (a cooling system, a power conversion system, etc.) to be located under a turbine tower, whereas allowing only a rotary body with vertical blades to be located on the upper portion of the turbine tower, unlike a conventional horizontal axis wind turbine, thereby remarkably reducing a top-head weight of the wind turbine, greatly decreasing installation and maintenance costs, removing technical difficulties (Since the conventional horizontal axis wind turbine has airfoil blades, it is hard to achieve a large scale turbine due to load collection generated by one point support) in large scale construction, and allowing a center of weight to move to a portion under the turbine tower so that if the vertical axis wind turbine is applied for floating offshore wind power generation, it advantageously ensures the miniaturization of a floating body and the stability of a floating posture.

BACKGROUND ART

Generally, a horizontal axis turbine structure, which is used in a conventional superconducting wind turbine technology, replaces a normal conducting generator with a superconducting generator and additionally has a cryogenic cooling system for cooling the superconducting generator.

In the case where a superconductor is used, high energy density of the generator is obtained to achieve the miniaturization and lightweightness of the superconducting generator, unlike the normal conducting generator.

However, the cooling system for cooling the superconducting generator is additionally located in a nacelle of the turbine, thereby disturbing the miniaturization and lightweightness of the entire wind turbine.

If the cooling system is located under the turbine tower, a supply line for transferring a cooling medium to the upper portion of the turbine tower becomes extended, thereby causing technical difficulties in manufacturing, maintaining, and repairing the cooling system.

Further, the superconducting generator of the conventional horizontal axis turbine structure is a radial-gap type superconducting generator in which a radial gap exists between a rotor and a stator, and in this case, since a cooling path for cooling a superconducting field coil located on the rotor to a cryogenic temperature is located horizontally around a rotor shaft, a structure for supplying a cooling medium for cooling the rotating superconducting field coil through a separate cooling system on a normal temperature portion is required.

Accordingly, in the horizontal arrangement of the radial-gap type superconducting generator, a liquid refrigerant (refrigerant forced circulation or liquid refrigerant thermosyphon) is used, and otherwise, a cryogenic freezer is mounted. However, the two methods have the following disadvantages.

Firstly, a rotating coupling is needed in supplying a refrigerant to a rotating body in both of the refrigerant forced circulation and the liquid refrigerant thermosyphon, which requires periodical maintenance and increases manufacturing and maintenance costs, and in the case of conduction cooling through a metal medium, temperature distribution is locally unbalanced due to thermal contraction of the metal, while it is hard to perform immediate cooling due to thermal inertia, thereby decreasing operating reliability. Further, in the case of the forced circulation, a cryogenic pump and a blower for refrigerant circulation are needed to increase manufacturing and maintenance costs, and additional design technologies for the cooling path, the conduction cooling, and a vacuum insulation structure for optimizing cooling performance have to be required.

Secondly, in the case of the method in which the cryogenic freezer is mounted, periodical maintenance for the freezer and a compressor is necessarily required, and in the same manner as the method using the liquid refrigerant, a rotating coupling for supplying a refrigerant to a rotating body is needed, which requires periodical maintenance (increases manufacturing and maintenance costs). In the case of conduction cooling through a metal medium, temperature distribution is locally unbalanced due to thermal contraction of the metal, while it is hard to perform immediate cooling due to thermal inertia, thereby decreasing operating reliability, and additional design for the conduction cooling and the vacuum insulation structure for optimizing cooling performance has to be required.

Further, the conventional horizontal axis wind turbine is hard to become larger in size due to load collection generated by one point support of an airfoil blade and is increased in a height of a center of weight, thereby increasing behavior instability and the size of a floating body.

Further, the conventional horizontal axis wind turbine is hard to be manufactured due to the consistent increase of the weight of the blade and the increase of the installation and maintenance costs, and especially, as all parts of the generator are located on the uppermost portion of the generator, the turbine tower is consistently increased in height (which requires a super-large crane installation line and increases maintenance time).

PRIOR ART LITERATURE

Patent Literature (Patent literature 1) 1. Korean Patent No. 10-1766684 (Issued on Aug. 3, 2017)

DISCLOSURE OF THE INVENTION

Technical Problems to be Solved

It is an object of the present invention to provide a vertical axis wind turbine equipped with a high-temperature superconducting generator having a batch impregnation cooling structure using a cryogen that is configured to allow the superconducting generator and accessory devices (a cooling system, a power conversion system, etc.) to be located under a turbine tower, whereas allowing only a rotary body with vertical blades to be located on the upper portion of the turbine tower, unlike a conventional horizontal axis wind turbine, thereby remarkably reducing a top-head weight of the wind turbine, greatly decreasing installation and maintenance costs, removing technical difficulties (Since the conventional horizontal axis wind turbine has airfoil blades, it is hard to achieve a large scale turbine due to load collection generated by one point support) in large scale construction, and allowing a center of weight to move to a portion under the turbine tower so that if the vertical axis wind turbine is applied for floating offshore wind power generation, it advantageously ensures the miniaturization of a floating body and the stability of a floating posture.

It is another object of the present invention to provide a vertical axis wind turbine equipped with a high-temperature superconducting generator having a batch impregnation cooling structure using a cryogen that is configured to allow the superconducting generator to be under batch impregnation in a liquid refrigerant inside a cryostat, thereby minimizing a vacuum insulation structure of the cryostat for maintaining a cryogenic temperature, and configured to provide the integration and simplicity of a cooling structure, thereby making it easy to apply a fully superconducting structure for superconducting an armature coil located on a stator of the superconducting generator.

It is yet another object of the present invention to provide a vertical axis wind turbine equipped with a high-temperature superconducting generator having a batch impregnation cooling structure using a cryogen that is constructed as a vertical structure so that the vertical axis wind turbine does not require a rotating coupling used necessarily for the supply of a cooling medium to a rotating body in the conventional horizontal structure, thereby achieving simplification in the cooling structure for cryogenic cooling.

It is still another object of the present invention to provide a vertical axis wind turbine equipped with a high-temperature superconducting generator having a batch impregnation cooling structure using a cryogen that is configured to allow a copper conductor being in a cooled state to a cryogenic temperature to have substantially lower resistivity than that being in a normal temperature, in a partially superconducting structure wherein the copper conductor is used for an armature coil, thereby increasing the current density of the armature coil.

It is yet still another object of the present invention to provide a vertical axis wind turbine equipped with a high-temperature superconducting generator having a batch impregnation cooling structure using a cryogen that is configured to have the liquid refrigerant impregnation structure in the direction of gravity because of vertical arrangement to achieve direct and immediate heat exchanging with a liquid refrigerant, thereby improving the thermal stability of a superconducting coil, and configured to achieve direct heat exchanging upon the cryogenic cooling of a superconducting field coil located on a rotor or a superconducting armature coil located on a stator, thereby remarkably reducing the cooling time to a target operating temperature (Because the superconducting generator of the conventional horizontal arrangement structure adopts a conduction cooling structure through a metal medium, temperature distribution is locally unbalanced due to thermal contraction of the metal occurring upon cryogenic cooling to cause the being in a superconducting state to be quenched (decreased in thermal superconducting coil stability) to a normal conducting state).

It is yet another object of the present invention to provide a vertical axis wind turbine equipped with a high-temperature superconducting generator having a batch impregnation cooling structure using a cryogen that is configured to allow a cooling structure through liquid refrigerant impregnation to require no structure for vacuum insulation between a normal temperature portion and a cryogenic temperature portion in designing a rotor and a stator, thereby achieving simple structure design and reducing the volume and weight of the structure because of the removal of the vacuum insulation structure, unlike the horizontal arrangement structure, configured to minimize an electromagnetic air gap between the rotor and the stator, thereby greatly reducing an amount of a high-priced superconducting coil used, and configured to optimize energy density, thereby achieving the miniaturization and lightweightness of the superconducting generator.

It is still another object of the present invention to provide a vertical axis wind turbine equipped with a high-temperature superconducting generator having a batch impregnation cooling structure using a cryogen that is configured to allow a cooling structure through liquid refrigerant impregnation to require no optimization design of a cooling path for optimizing the cooling performance of a superconducting coil and current leads in the case of a structure where conduction cooling is performed through a metal medium, and configured to allow the cooling structure to adopt no circulation through the cooling path, thereby requiring no cryogenic pump or blower for forced circulation and being very advantageous in designing, manufacturing, maintaining, and repairing the system.

Technical Solutions

To accomplish the above-mentioned objects, according to the present invention, there is provided a vertical axis wind turbine equipped with a high-temperature superconducting generator having a batch impregnation cooling structure using a cryogen, the vertical axis wind turbine including: the superconducting generator 100 having a rotor core 110 vertically standing up thereon, a rotor 120 provided by locating a high-temperature superconducting field coil in a circumferential direction of the rotor core 110, a stator 130 provided by locating a superconducting armature coil in such a way as to be spaced apart from the rotor 120 by a given distance, and a cryostat 140 adapted to accommodate the rotor core 110, the rotor 120, and the stator 130, as an integral module, therein and having a refrigerant circulation inlet pipe 141 and a refrigerant circulation outlet pipe 142 disposed on one side and the other side thereof to perform batch impregnation cooling for the superconducting generator 100 by means of a circulation refrigerant (introduced refrigerant is liquid and discharged refrigerant is gas) introduced from a cryogenic cooling system 300; a tower assembly 200 having a rotor shaft 210 connected to top end periphery of the rotor core 110 in such a way as to allow a top end portion thereof to extend to the outside of a top plate of the cryostat 140 so that the rotor shaft 210 is connected vertically to a main shaft 240 having vertical blades 230 by means of a shaft coupling 220, the main shaft 240 rotating inside a turbine tower 250 through support bearings 260; and the cryogenic cooling system 300 having a cooling chamber 320 in which a circulation type cooling pump 310 is disposed adapted to supply a liquid refrigerant to the cryostat 140 so that a vaporized gas refrigerant is collected, and a cryogen tank 330 and a helium compressor 340 connected to one side and the other side of the cooling chamber 320 through respective supply lines.

That is, if external power is supplied to the slip ring through the brush, the power supplied to the slip ring is conductive to the current leads rotating together with the high-temperature superconducting field coil of the rotor core, and the power supplied to the current leads is supplied to the high-temperature superconducting field coil of the rotor core, so that the rotor core rotates inside the stator.

Moreover, the rotor core 110 and the rotor shaft 210 are connected to each other by means of a non-contact type exciter 160, and the non-contact type exciter 160 has a flux pump header 161 conductive to the high-temperature superconducting field coil and a permanent magnet 163 coupled to a flux pump rotor 162 and located axially on top of the flux pump header 161 under a non-contact structure, the flux pump rotor 162 being coaxial with the rotor shaft 210 and exposed to the outside of the top plate of the cryostat 140 (while passing through a rotary seal and a bearing) in such a way as to interlockingly rotate through a power transmission motor 164 and a rotary plate 165 and control the rotation of the permanent magnet 163.

Further, the cryostat 140 has a re-condensing cooler 170 and a re-condensing heat exchanger 180 disposed on one side of the inside thereof to perform re-condensation and re-liquefication of a gas refrigerant therein.

Further, the cryostat 140 is formed of a double jacket consisting of an inner case and an outer case, and a vacuum is formed in a space between the inner case and the outer case.

Advantageous Effectiveness of the Invention

Unlike the conventional horizontal axis wind turbine, according to the present invention, the vertical axis wind turbine is configured to allow the power generator and the accessory devices (the cooling system, the power conversion system, etc.) to be located under the turbine tower, whereas allowing only the rotary body with the vertical blades to be located on the upper portion of the turbine tower, thereby remarkably reducing a top-head weight of the wind turbine.

According to the present invention, the installation and maintenance costs are greatly reduced, and technical difficulties (Since the conventional horizontal axis wind turbine has airfoil blades, it is hard to achieve a large scale turbine due to load collection generated by one point support) in large scale construction are removed.

According to the present invention, the vertical axis wind turbine is configured to have a center of weight moving to a portion under the turbine tower, so that if the vertical axis wind turbine is applied for floating offshore wind power generation, it advantageously ensures the miniaturization of a floating body and the stability of a floating posture.

According to the present invention, the superconducting generator is under the batch impregnation in the liquid refrigerant inside the cryostat, thereby minimizing a vacuum insulation structure of the cryostat for maintaining a cryogenic temperature.

According to the present invention, the vertical axis wind turbine is configured to provide the integration and simplicity of the cooling structure, thereby making it easy to apply a fully superconducting structure for superconducting the armature coil located on the stator of the superconducting generator.

Further, the vertical axis wind turbine according to the present invention is constructed as a vertical structure so that it does not require a rotating coupling used necessarily for the supply of a cooling medium to a rotating body in the conventional horizontal structure, thereby achieving the simplification in the cooling structure for cryogenic cooling.

According to the present invention, the copper conductor being in a cooled state to a cryogenic temperature has substantially lower resistivity than that being in a normal temperature, in a partially superconducting structure wherein the copper conductor is used for the armature coil, thereby increasing the current density of the armature coil.

According to the present invention, the vertical axis wind turbine has the liquid refrigerant impregnation structure in the direction of gravity because of the vertical arrangement to achieve direct and immediate heat exchanging with the liquid refrigerant, thereby improving the thermal stability of the superconducting coil, and the vertical axis wind turbine is configured to achieve direct heat exchanging upon the cryogenic cooling of the superconducting field coil located on the rotor or the superconducting armature coil located on the stator, thereby remarkably reducing the cooling time to a target operating temperature.

According to the present invention, further, the cooling structure through the liquid refrigerant impregnation does not need any structure for vacuum insulation between a normal temperature portion and a cryogenic temperature portion in designing the rotor and the stator, thereby achieving simple structure design and reducing the volume and weight of the structure because of the removal of the vacuum insulation structure, unlike the horizontally arrangement structure.

According to the present invention, the electromagnetic air gap between the rotor and the stator is minimized, thereby greatly reducing an amount of a high-priced superconducting coil used, and accordingly, energy density is optimized, thereby achieving the miniaturization and light-weightness of the superconducting generator.

According to the present invention, the cooling structure through the liquid refrigerant impregnation does not require the optimization design of a cooling path for optimizing the cooling performance of the superconducting coil and the current leads in the case of a structure where conduction cooling is performed through a metal medium, and further, the cooling structure does not adopt the circulation through the cooling path, thereby requiring no cryogenic pump or blower for forced circulation and being very advantageous in designing, manufacturing, maintaining, and repairing the system.

EMBODIMENTS OF THE INVENTION

Hereinafter, embodiments of the prese invention will be explained in detail with reference to the attached drawings.

Referring to FIGS. 1 to 6, a vertical axis wind turbine according to the present invention largely includes an axis type superconducting generator 100, a tower assembly 200, and a cryogenic cooling system 300.

The axis type superconducting generator 100 has a rotor core 110 vertically standing up thereon and a rotor 120 provided by locating a high-temperature superconducting field coil in a circumferential direction of the rotor core 110.

In this case, a stator 130 is provided by locating a superconducting armature coil in such a way as to be spaced apart from the rotor 120 by a given distance, so that upon rotation of the rotor 120, the stator 130 helps superconducting power generation, together with the rotor 120.

The rotor core 110, the rotor 120, and the stator 130, as an integral module, are accommodated in a cryostat 140, and the cryostat 140 has a refrigerant circulation inlet pipe 141 and a refrigerant circulation outlet pipe 142 disposed on one side and the other side thereof to perform batch impregnation cooling by means of a circulation refrigerant (introduced refrigerant is liquid and discharged refrigerant is gas) introduced from the cryogenic cooling system 300.

Figure 5:
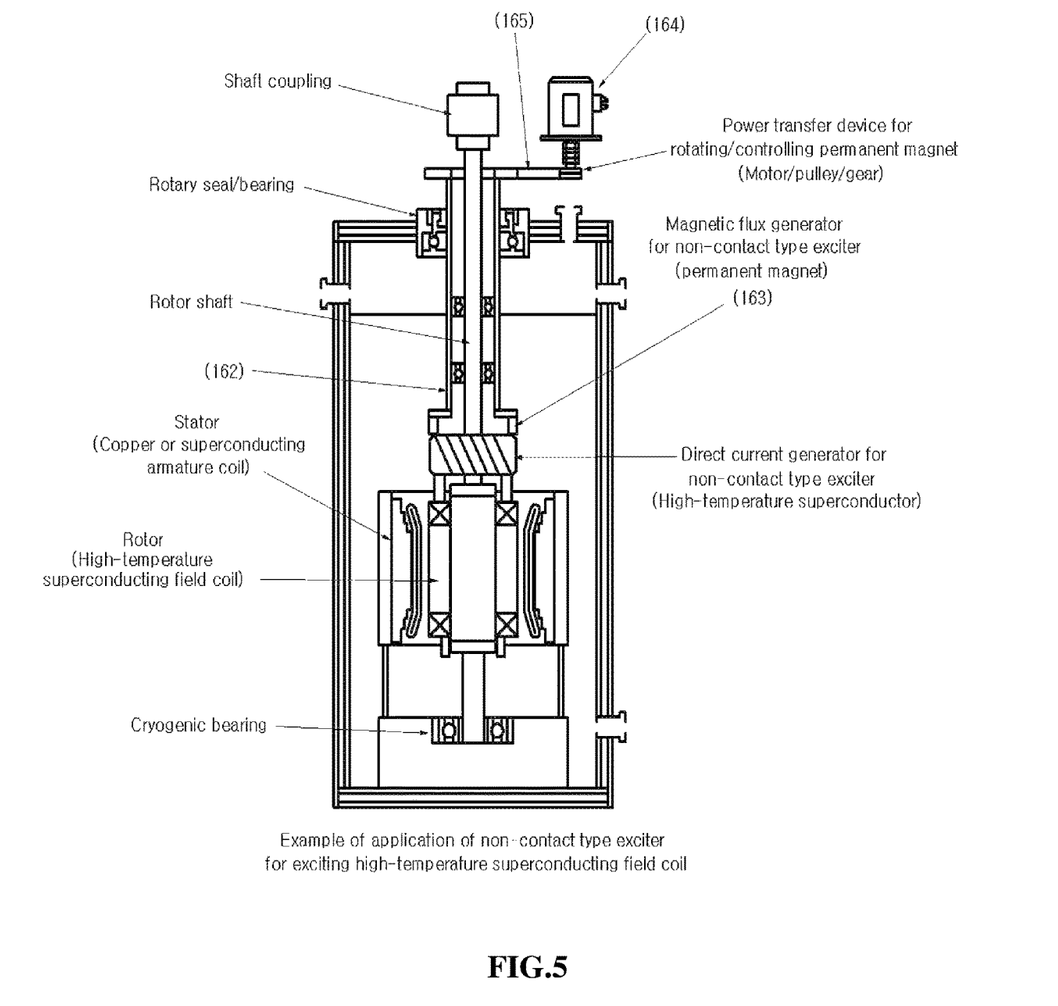
FIG. 5 is an exemplary view showing a non-contact type exciter applied to the high-temperature superconducting generator according to another embodiment of the present invention.

According to another embodiment of the present invention, further, the rotor core 110 and a rotor shaft 210 are connected to each other by means of a non-contact type exciter 160, and the non-contact type exciter 160 has a flux pump header 161 conductive to the high-temperature superconducting field coil.

In this case, further, a permanent magnet 163, which is coupled to a flux pump rotor 162, is located axially on top of the flux pump header 161 under a non-contact structure.

The flux pump rotor 162 is coaxial with the rotor shaft 210 and branched to the outside of a top plate of the cryostat 140 (while passing through a rotary seal and a bearing) in such a way as to interlockingly rotate through a power transmission motor 164 and a rotary plate 165 and control the rotation of the permanent magnet 163.

Figure 6:
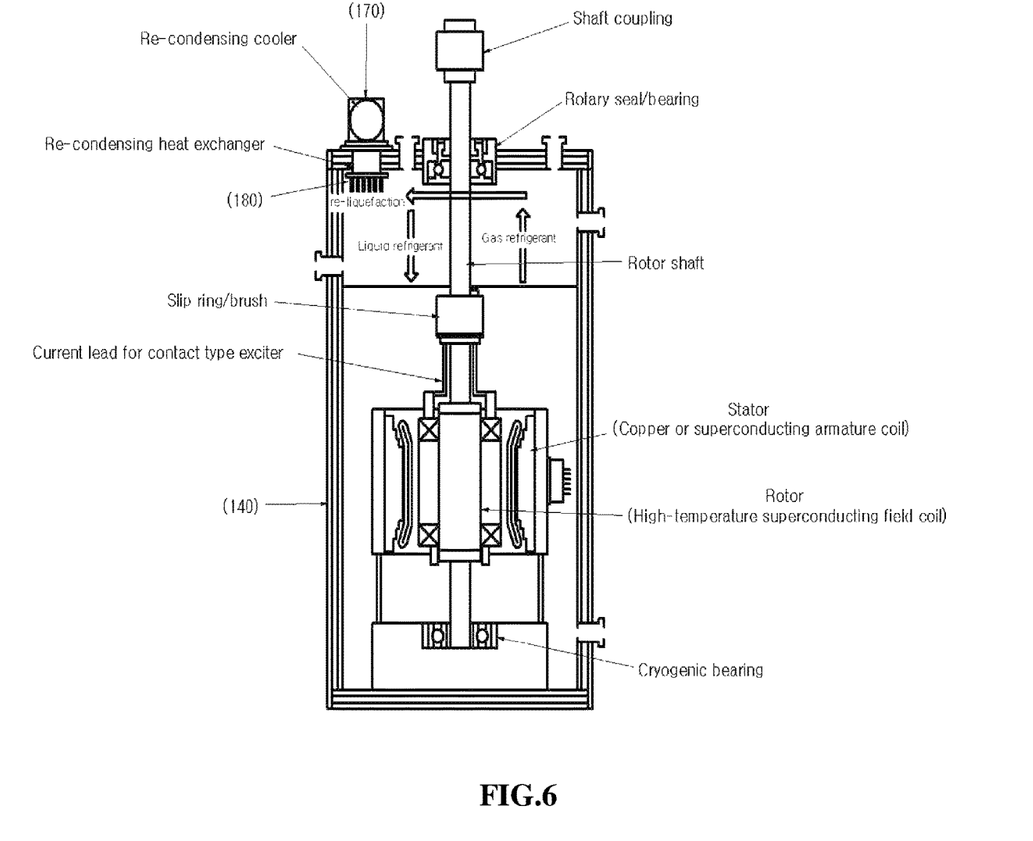
FIG. 6 is an exemplary view showing a re-condensing cooler and a re-condensing heat exchanger with re-condensing and re-liquefying structures that are applied to the high-temperature superconducting generator according to the present invention.

In this case, the cryostat 140 has a re-condensing cooler 170 and a re-condensing heat exchanger 180 disposed on one side of the inside thereof to perform re-condensation and re-liquefication of a gas refrigerant in the cryostat 140.

The cryostat 140 is formed of a double jacket consisting of an inner case and an outer case, and a vacuum is formed in a space between the inner case and the outer case.

Figure 1:
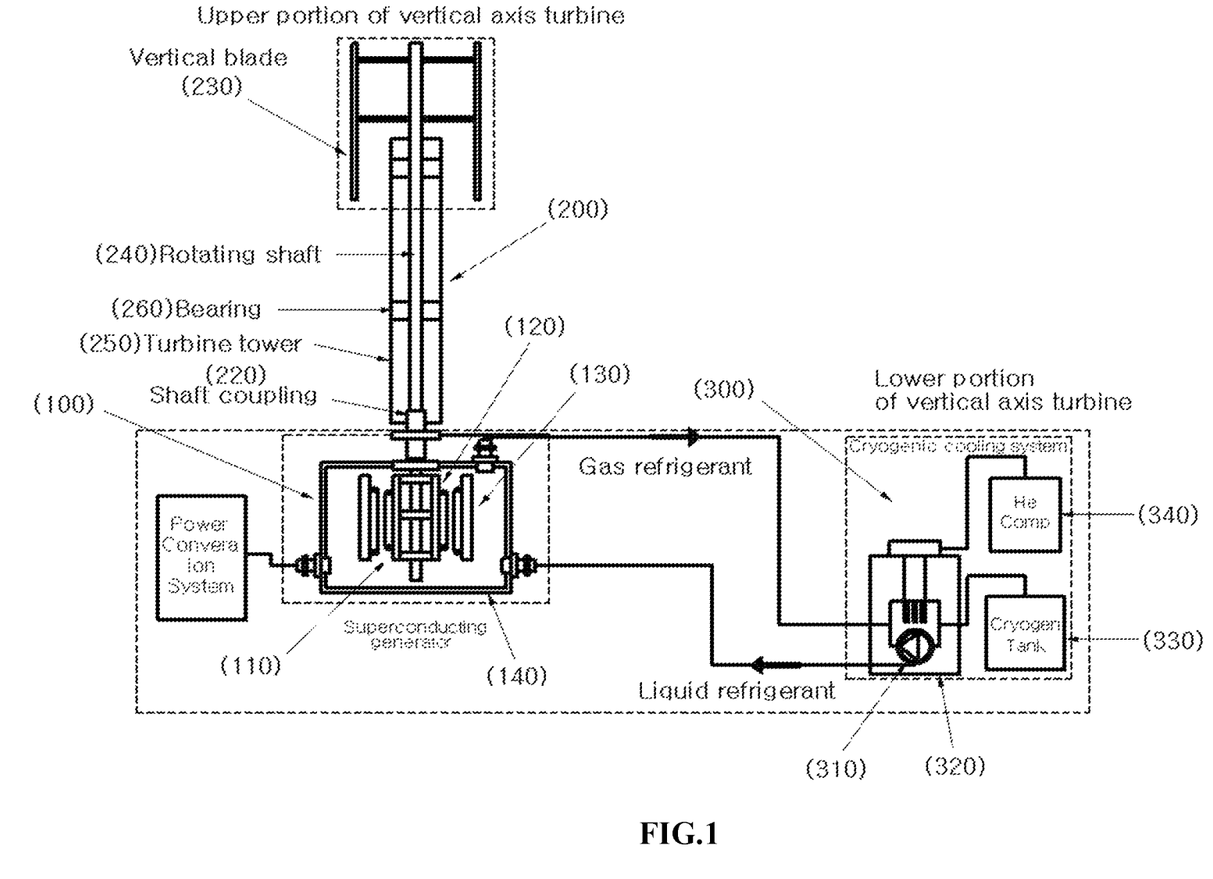
FIG. 1 is an exemplary view showing a configuration of a vertical axis wind turbine equipped with a high-temperature superconducting generator having a batch impregnation cooling structure using a cryogen according to the present invention.

Further, the tower assembly 200 has the rotor shaft 210 connected to top end periphery of the rotor core 110, and a top end portion of the rotor shaft 210 is branched to the outside of the top plate of the cryostat 140 (while passing through a rotary seal and a bearing) in such a way as to allow a shaft coupling 220 to be connected vertically to a main shaft 240 having vertical blades 230.

In this case, the main shaft 240 rotates inside a turbine tower 250 through support bearings 260.

Further, the cryogenic cooling system 300 has a cooling chamber 320 in which a circulation type cooling pump 310 is disposed, which is adapted to supply the liquid refrigerant to the cryostat 140, so that the vaporized gas refrigerant is collected.

In this case, a cryogen tank 330 and a helium compressor 340 are connected to one side and the other side of the cooling chamber 320 through respective supply lines.

Figure 2:
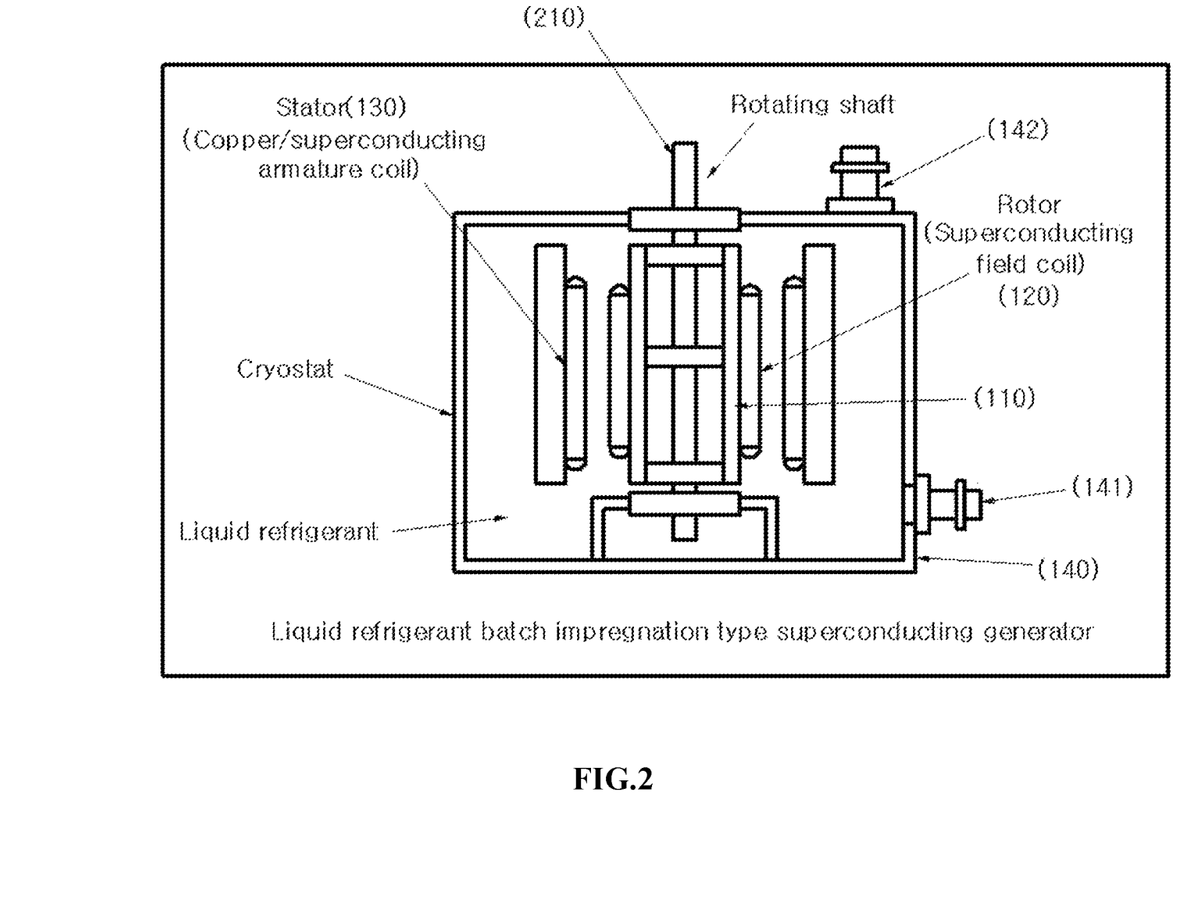
FIGS. 2 to 3 are exemplary views showing the high-temperature superconducting generator having the batch impregnation cooling structure according to the present invention.
Figure 3:
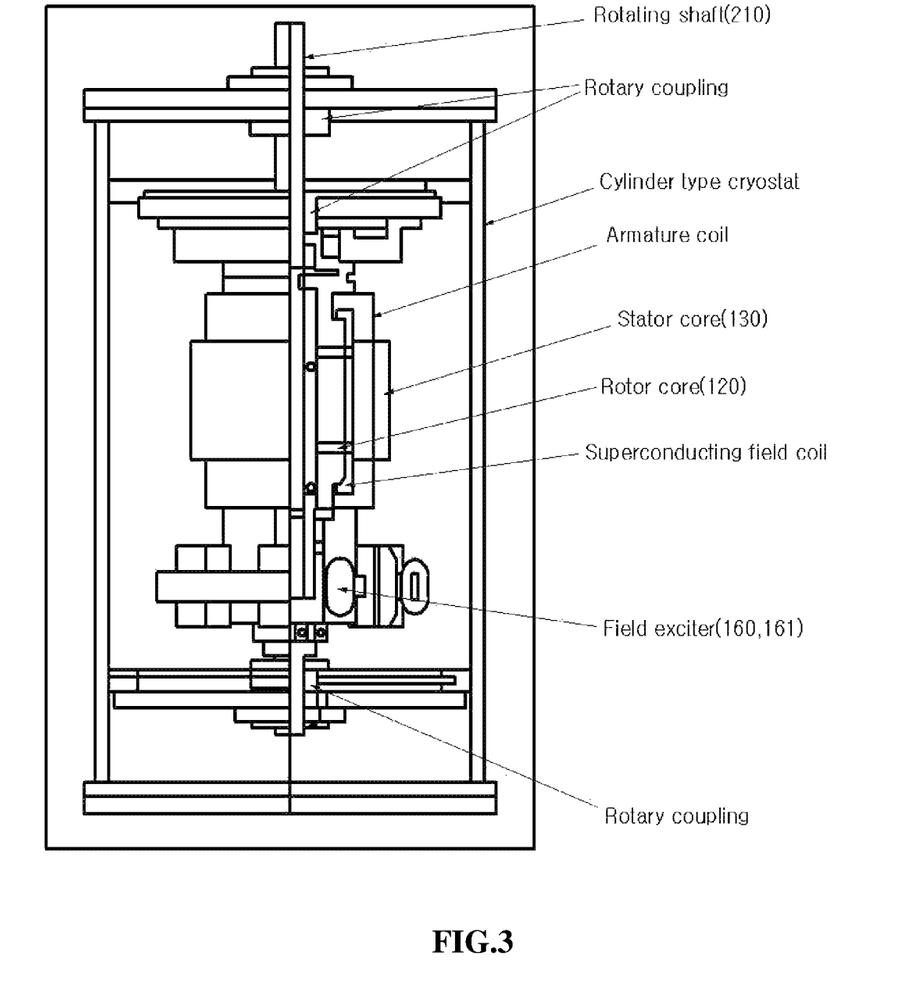
Figure 4:
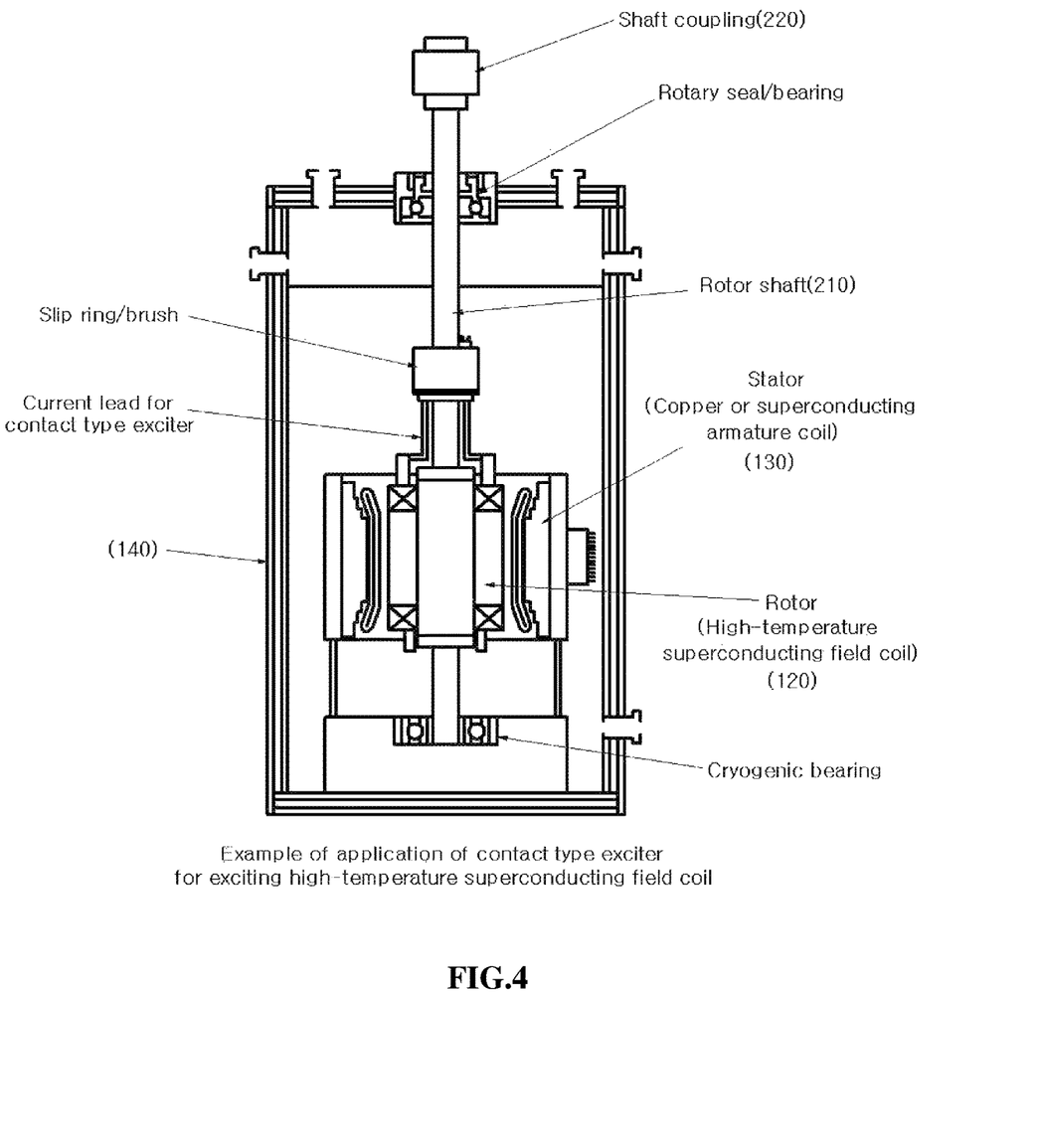
FIG. 4 is an exemplary view showing a contact type exciter applied to the high-temperature superconducting generator according to an embodiment of the present invention.

According to the present invention, as shown in FIGS. 1 to 3, the vertical axis wind turbine is equipped with the superconducting generator, thereby solving various technical problems occurring in developing and operating the superconducting generator.

In building the vertical axis wind turbine according to the present invention, that is, the vertical blades located on the upper portion of the turbine tower are connected to the upper end of the main shaft as a main rotating shaft passing through the interior of the turbine tower.

In this case, the main shaft (the main rotating shaft) rotates, while being supported by the support bearings disposed inside the tower turbine, and particularly, the main shaft is directly connected to the rotor shaft of the superconducting generator located under the tower turbine, so that the rotary forces of the vertical blades, which are generated by wind, are immediately transferred to the superconducting generator.

Accordingly, the vertical axis wind generator according to the present invention is configured to allow the superconducting generator, the cryogenic cooling system, and a power conversion system to be all disposed in a structure located on the ground (under the tower turbine).

In this case, the superconducting generator located under the tower turbine is disposed vertically with respect to the rotor shaft and directly connected to the main shaft (the main rotating shaft) of the tower turbine, and accordingly, a radial-gap type superconducting generator and an axial-gap type superconducting generator may be structurally adopted.

Further, as shown in FIGS. 2 to 6, the superconducting generator in which the rotor or stator is disposed is configured to be located vertically inside the cryostat serving as the outer case, and the rotary shaft of the superconducting generator is withdrawn to a normal temperature portion through a special bearing support serving as a sealing structure attached to top of the cryostat and thus connected to the main rotating shaft of the wind turbine.

If a superconducting bearing having a liquefication temperature of the refrigerant used as an operating temperature is used, the superconducting bearing supports the rotor shaft in a non-contact manner to allow a frictional loss to be lower than that in a contact type bearing support structure.

Accordingly, the cryogenic cooling system of the present invention is located under the tower turbine, and the liquid refrigerant is supplied from the cryostat to allow the superconducting generator to be cooled to a target operating temperature. After the cooling, the vaporized gas refrigerant is collected back to the cooling system, re-cooled, and re-supplied, so that through such circulation, the superconducting generator becomes cooled.

In this case, the cryogenic liquid refrigerant used is determined according to the specifications of the superconducting coil, and helium, argon, neon, hydrogen, oxygen, nitrogen, and the like may be used as the cryogenic liquid refrigerant.

That is, under the batch impregnation cooling structure of the cryogenic liquid refrigerant, the superconducting generator is cooled by the cryogenic refrigerant being in a liquid state supplied initially from the outside.

Most of the liquid refrigerant introduced upon the initial cooling is vaporized, and the temperature of the superconducting generator becomes decreased for several hours until the superconducting generator being in a normal temperature has thermal equilibrium with the temperature of the liquid refrigerant. Simultaneously, the vaporized refrigerant is generated.

In this case, the liquid refrigerant is vaporized in proportion to the loss of the superconducting generator even at the temperature at the time point of the thermal equilibrium.

Further, the vaporized refrigerant generated upon the initial cooling and the normal operation is emitted to the outside or collected to a separate cryogenic cooling system, re-condensed, and re-supplied to the cryostat where the superconducting generator is located.

In this case, as shown in FIG. 6, the cryostat for the superconducting generator is configured to allow the cooler and the heat exchanger for refrigerant re-condensation to be connected directly to top thereof, thereby enhancing the cooling efficiency of the superconducting generator.

That is, the cooler and the heat exchanger enables the superconducting generator to be integral with the cooling system, thereby simplifying the cooling system in configuration and reducing the volume of the cooling system.

Accordingly, a single cooler or a plurality of coolers may be used in consideration of cooling amounts, and in some cases, the coolers may be located on the underside or side of the cryostat.

Further, a cryogenic freezer attached to the cryostat for the superconducting generator is controlled in temperature to allow the liquid refrigerant stored in the cryostat to be overcooled to enhance the cooling performance and to be cooled to a solid to improve the cooling performance and the thermal stability of the superconducting field coil.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

| [Explanations of Reference Numerals] | |
|---|---|
| 100 . . . | Superconducting generator |
| 110 . . . | Rotor core |
| 120 . . . | Rotor |
| 130 . . . | Stator |
| 140 . . . | Cryostat |
| 141 . . . | Inlet pipe |
| 142 . . . | Outlet pipe |
| 160 . . . | Non-contact type exciter |
| 161 . . . | Flux pump header |
| 162 . . . | Flux pump rotor |
| 163 . . . | Permanent magnet |
| 164 . . . | Motor |
| 165 . . . | Rotary plate |
| 170 . . . | Cooler |
| 180 . . . | Heat exchanger |
| 200 . . . | Tower assembly |
| 210 . . . | Rotor shaft |
| 220 . . . | Shaft coupling |
| 230 . . . | Vertical blade |
| 240 . . . | Main shaft |
| 250 . . . | Turbine tower |
| 260 . . . | Support bearing |
| 300 . . . | Cryogenic cooling system |
| 310 . . . | Cooling pump |
| 320 . . . | Cooling chamber |
| 330 . . . | Cryogen tank |
| 340 . . . | Helium compressor |

The invention claimed is:

1. A vertical axis wind turbine equipped with a high-temperature superconducting generator having a batch impregnation cooling structure using a cryogen, the vertical axis wind turbine comprising:

the superconducting generator having a rotor core vertically standing up thereon, a rotor provided by locating a high-temperature superconducting field coil in a circumferential direction of the rotor core, a stator provided by locating a superconducting armature coil so as to be spaced apart from the rotor by a distance, and a cryostat adapted to accommodate the rotor core, the rotor, and the stator, as an integral module, therein and having a refrigerant circulation inlet pipe and a refrigerant circulation outlet pipe disposed on one side and another side of the cryostat to perform batch impregnation cooling for the superconducting generator by a circulation refrigerant introduced from a cryogenic cooling system;

a tower assembly having a rotor shaft connected to a top end periphery of the rotor core so as to allow a top end portion thereof to extend to the outside of a top plate of the cryostat so that the rotor shaft is connected vertically to a main shaft having vertical blades by a shaft coupling the main shaft rotating inside a turbine tower through support bearings; and the cryogenic cooling system having a cooling chamber in which a circulation cooling pump is disposed adapted to supply a liquid refrigerant to the cryostat so that a vaporized gas refrigerant is collected, and a cryogen tank connected to one side of the cooling chamber and a helium compressor connected to another side of the cooling chamber, through respective supply lines.

2. The vertical axis wind turbine according to claim 1, wherein the rotor core and the rotor shaft are connected to each other by a non-contact type exciter, and the non-contact type exciter has a flux pump header conductive to the high-temperature superconducting field coil and a permanent magnet coupled to a flux pump rotor and located axially on top of the flux pump header under a non-contact structure, the flux pump rotor being coaxial with the rotor shaft and exposed to the outside of the top plate of the cryostat while passing through a rotary seal and a bearing so as to interlockingly rotate through a power transmission motor and a rotary plate and control the rotation of the permanent magnet.

3. The vertical axis wind turbine according to claim 1, wherein the cryostat has a re-condensing cooler and a re-condensing heat exchanger disposed on one side of an inside thereof to perform re-condensation and re-liquefication of a gas refrigerant therein.

4. The vertical axis wind turbine according to claim 1, wherein the cryostat is formed of a double jacket comprising an inner case and an outer case, and a vacuum is formed in a space between the inner case and the outer case.

* * * * *